US012307848B2

(12) United States Patent
Li

(10) Patent No.: US 12,307,848 B2
(45) Date of Patent: May 20, 2025

(54) VIRTUAL BARRIER GATE SYSTEM AND VIRTUAL BARRIER GATE CONTROL METHOD

(71) Applicant: ZHEJIANG GEELY HOLDING GROUP CO., LTD, Zhejiang (CN)

(72) Inventor: Shufu Li, Zhejiang (CN)

(73) Assignee: ZHEJIANG GEELY HOLDING GROUP CO., LTD, Hangzhou (CN)

( * ) Notice: Subject to any disclaimer, the term of this patent is extended or adjusted under 35 U.S.C. 154(b) by 203 days.

(21) Appl. No.: 18/029,168

(22) PCT Filed: Dec. 24, 2020

(86) PCT No.: PCT/CN2020/139063
§ 371 (c)(1),
(2) Date: Mar. 29, 2023

(87) PCT Pub. No.: WO2022/068098
PCT Pub. Date: Apr. 7, 2022

(65) Prior Publication Data
US 2023/0274595 A1    Aug. 31, 2023

(30) Foreign Application Priority Data
Sep. 30, 2020   (CN) .......................... 202011063302.5

(51) Int. Cl.
*G07C 9/30* (2020.01)
*E01F 13/00* (2006.01)
(Continued)

(52) U.S. Cl.
CPC .............. *G07C 9/30* (2020.01); *G03H 1/0011* (2013.01); *G06T 19/20* (2013.01); *G06V 20/52* (2022.01);
(Continued)

(58) Field of Classification Search
CPC .......... G07C 9/30; G07C 9/10; G03H 1/0011; G03H 2227/03; G03H 1/0005;
(Continued)

(56) References Cited

U.S. PATENT DOCUMENTS 10,284,822 B2 * 5/2019 Murar .................... B60K 35/00
10,373,377 B1 * 8/2019 Niewiadomski ... G01C 21/3697
(Continued)

FOREIGN PATENT DOCUMENTS

| CN | 105809797 A | 7/2016 |
| CN | 109403232 A | 3/2019 |

(Continued)

OTHER PUBLICATIONS

European Search Report issued in counterpart European Patent Application No. EP 20956114.1, dated Jan. 18, 2024.
(Continued)

*Primary Examiner* — Yujang Tswei
(74) *Attorney, Agent, or Firm* — Westbridge IP LLC

(57) ABSTRACT

Disclosed are a virtual barrier gate system (10) and a virtual barrier gate control method. The system comprises a control apparatus (100) and a holographic projection apparatus (200) connected to the control apparatus (100), wherein the control apparatus (100) is configured to generate a first control signal on the basis of a starting signal and send the first control signal to the holographic projection apparatus (200); and the holographic projection apparatus (200) is configured to project, according to the first control signal, a three-dimensional holographic image with a specified shape to a preset position to serve as a virtual barrier gate. By using air holographic projection technology, a physical barrier gate is virtualized into an air holographic projection image, thereby improving the safety of the barrier gate and reducing labor costs.

5 Claims, 3 Drawing Sheets

(51) Int. Cl.
  *G03H 1/00* (2006.01)
  *G06T 19/20* (2011.01)
  *G06V 20/52* (2022.01)
  *G06V 20/62* (2022.01)
  *G06V 40/10* (2022.01)
  *G07C 9/10* (2020.01)

(52) U.S. Cl.
  CPC ............ *E01F 13/00* (2013.01); *G03H 1/0005* (2013.01); *G03H 2227/03* (2013.01); *G06T 2219/2012* (2013.01); *G06T 2219/2021* (2013.01); *G06V 20/62* (2022.01); *G06V 20/625* (2022.01); *G06V 40/103* (2022.01); *G06V 2201/08* (2022.01); *G07C 9/10* (2020.01)

(58) Field of Classification Search
  CPC ............ G06T 19/20; G06T 2219/2012; G06T 2219/2021; G06V 20/52; G06V 2201/08; G06V 20/625; G06V 20/62; G06V 40/103; E01F 13/00
  See application file for complete search history.

(56) References Cited

U.S. PATENT DOCUMENTS

| | | | | |
|---|---|---|---|---|
| 10,565,733 | B1* | 2/2020 | Zhang | ........................ G06T 7/20 |
| 2005/0092831 | A1* | 5/2005 | Sandoval | ............... G07B 15/04 235/382 |
| 2019/0082149 | A1* | 3/2019 | Correnti | ........... G08B 13/19613 |
| 2022/0005017 | A1* | 1/2022 | Lee | ....................... G06Q 20/325 |
| 2022/0033077 | A1* | 2/2022 | Myslinski | .............. G05D 1/102 |
| 2022/0228419 | A1* | 7/2022 | Tiso | ................... G07C 9/00944 |

FOREIGN PATENT DOCUMENTS

| | | |
|---|---|---|
| CN | 109727451 A | 5/2019 |
| CN | 109727484 A | 5/2019 |
| CN | 111127918 A | 5/2020 |
| CN | 111508121 A | 8/2020 |
| CN | 211256765 U | 8/2020 |
| CN | 112030814 A | 12/2020 |
| CN | 212801306 U | 3/2021 |
| FR | 2800105 A1 | 4/2001 |
| IN | 111364388 A | 7/2020 |
| KR | 101485457 B1 | 1/2015 |
| KR | 102129105 B1 | 7/2020 |
| KR | 102147872 B1 | 8/2020 |

OTHER PUBLICATIONS

Office Action issued in counterpart European Patent Application No. EP 20956114.1, dated Jan. 30, 2024.
Chinese Intellectual Property Office (ISR/CN), "International Search Report for PCT/CN2020/139063", China, Jun. 24, 2021.
First Office Action issued in counterpart Chinese Patent Application No. 202011063302.5, dated Jul. 22, 2024.

* cited by examiner

VIRTUAL BARRIER GATE SYSTEM AND VIRTUAL BARRIER GATE CONTROL METHOD

CROSS-REFERENCE TO RELATED PATENT APPLICATION

This application is a U.S. national stage application of PCT Patent Application No. PCT/CN2020/139063 filed Dec. 24, 2020, which claims priority to and the benefit of Chinese Application No. 202011063302.5 filed Sep. 30, 2020, which are incorporated herein in their entireties by reference.

FIELD OF THE INVENTION

The present invention relates to the field of channel device technology, and particularly to a virtual barrier gate system and a virtual barrier gate control method.

BACKGROUND OF THE INVENTION

A barrier gate is a device widely used in a channel to manage the passing in and out of vehicles, pedestrians, or the like. In the prior art, a barrier gate is usually a mechanical mechanism, and mainly includes a rotation lever and a rotating mechanism. The barrier gate of a mechanical structure is prone to break down, an event of smashing a vehicle or hurting a pedestrian is prone to happen, and the barrier gate is usually required to be watched and maintained by a specially-assigned person on site. Once components of the barrier gate fail or are damaged, the components are not easy to replace. In addition, for the barrier gate, propaganda materials, such as advertisements, are usually arranged on a surface of the barrier gate by sticking, and the propaganda materials are difficult to switch or change.

BRIEF DESCRIPTION OF THE INVENTION

In view of the above problems, there are provided a virtual barrier gate system and a virtual barrier gate control method which overcome or at least partially solve the above problems.

An object of the present invention is to provide a virtual barrier gate system and a virtual barrier gate control method, which virtualize a physical barrier gate using air holographic projection technology and solve the problems that an existing barrier gate is prone to cause a mechanical fault, is prone to smash a vehicle or hurt a pedestrian and requires a special guardian.

A further object of the present invention is to realize target-oriented barrier gate image switching by identifying an attribute of a target object and modifying a projected three-dimensional holographic image of a virtual barrier gate according to the attribute of the target object.

In particular, according to an aspect of embodiments of the present invention, there is provided a virtual barrier gate system, including a control apparatus and a holographic projection apparatus connected to the control apparatus;
wherein the control apparatus is configured to generate a first control signal on the basis of a starting signal and send the first control signal to the holographic projection apparatus; and
the holographic projection apparatus is configured to project, according to the first control signal, a three-dimensional holographic image with a specified shape to a preset position to serve as a virtual barrier gate.

Optionally, a specific text or pattern is contained in the three-dimensional holographic image; and
the holographic projection apparatus is further configured to switch the specific text or pattern according to a preset rule.

Optionally, the virtual barrier gate system further includes:
a first image collection and analysis apparatus connected with the control apparatus and configured to collect image data in a first specified region before the preset position in a direction in which an object moves towards the preset position, identify the image data to obtain an attribute of a target object in the first specified region and send the attribute of the target object to the control apparatus;
the control apparatus is further configured to generate a second control signal according to the attribute of the target object and send the second control signal to the holographic projection apparatus; and
the holographic projection apparatus is further configured to modify the three-dimensional holographic image projected to the preset position according to the second control signal.

Optionally, the target object is a vehicle;
the attribute includes at least one of: a license plate number, a vehicle model and a color.

Optionally, the specific text contains a welcome phrase matched with the attribute of the vehicle;
the control apparatus is further configured to generate a third control signal according to the attribute of the vehicle and send the third control signal to the holographic projection apparatus; and
the holographic projection apparatus is further configured to display the welcome phrase matched with the attribute of the vehicle in the three-dimensional holographic image according to the third control signal.

Optionally, the virtual barrier gate system further includes a second image collection and analysis apparatus and an alarm apparatus which are connected to the control apparatus;
the second image collection and analysis apparatus is configured to collect image data in a second specified region before the preset position in a direction in which the vehicle is driven towards the preset position, process the image data to obtain driving data of the vehicle in the second specified region, and send the driving data of the vehicle to the control apparatus;
the control apparatus is further configured to generate an alarm signal according to the driving data of the vehicle and send the alarm signal to the alarm apparatus; and
the alarm apparatus is configured to give an alarm according to the alarm signal.

Optionally, the preset position is an entrance or an exit of a garage, and the holographic projection apparatus is provided on a ceiling or a side wall at the entrance or the exit of the garage.

According to another aspect of the embodiments of the present invention, there is further provided a virtual barrier gate control method, including:
generating a first control signal on the basis of a starting signal; and
projecting, according to the first control signal, a three-dimensional holographic image with a specified shape to a preset position to serve as a virtual barrier gate.

Optionally, a specific text or pattern is contained in the three-dimensional holographic image.

The method further includes:

switching the specific text or pattern according to a preset rule.

Optionally, the method further includes:

collecting image data in a first specified region before the preset position in a direction in which an object moves towards the preset position, and identifying the image data to obtain an attribute of a target object in the first specified region; and generating a second control signal according to the attribute of the target object, and modifying the three-dimensional holographic image projected to the preset position according to the second control signal.

Optionally, the target object is a vehicle, and the specific text contains a welcome phrase matched with the attribute of the vehicle.

The method further includes:

generating a third control signal according to the attribute of the vehicle, and displaying the welcome phrase matched with the attribute of the vehicle in the three-dimensional holographic image according to the third control signal.

Optionally, the target object is a vehicle;

before collecting image data in the first specified region before the preset position in the direction in which an object moves towards the preset position, the method further includes:

collecting image data in a second specified region before the preset position in a direction in which the vehicle is driven towards the preset position, and processing the image data to obtain driving data of the vehicle in the second specified region; and generating an alarm signal according to the driving data of the vehicle, and giving an alarm according to the alarm signal.

In the virtual barrier gate system and the virtual barrier gate control method according to the embodiments of the present invention, the three-dimensional holographic image with the specified shape is projected to the preset position according to the first control signal generated based on the starting signal to serve as the virtual barrier gate. With regard to a virtual barrier gate obtained by using air holographic projection technology to virtualize a physical barrier gate into an air holographic projection image, the technological content is high, a mechanical fault is not likely to occur, an event where a barrier gate smashes a vehicle or hurts a pedestrian will not happen, and a special guardian is not needed, thereby improving the safety of the barrier gate and reducing labor costs. Moreover, the specified shape of the three-dimensional holographic image of the virtual barrier gate can be preset and has various forms, such that the virtual barrier gate can be used at different application sites, and the adaptability of the virtual barrier gate is enhanced.

Further, in the solution of the embodiment of the present invention, target-oriented barrier gate image switching may be realized by identifying the attribute of the target object about to pass through the virtual barrier gate and then modifying the projected three-dimensional holographic image according to the second control signal generated based on the attribute of the target object, thereby improving the use experience of target personnel passing through the barrier gate.

The foregoing description merely briefly describes the technical solution of the present invention. To more clearly understand the technical means of the present invention, to allow the technical means of the present invention to be implemented according to content of the specification, and to make the foregoing and other objectives, features, and advantages of the present invention more comprehensible, particular embodiments of the present invention are described below.

According to the following detailed description of specific embodiments of the present invention in conjunction with drawings, those skilled in the art will better understand the aforementioned and other objects, advantages and features of the present invention.

BRIEF DESCRIPTION OF THE DRAWINGS

Some specific embodiments of the present invention will be described below in detail in an exemplary rather than restrictive manner with reference to the drawings. Identical reference numerals in the drawings represent identical or similar components or parts. Those skilled in the art should understand that these drawings are not necessarily drawn to scale. In the drawings.

DETAILED DESCRIPTION

Figure 1:
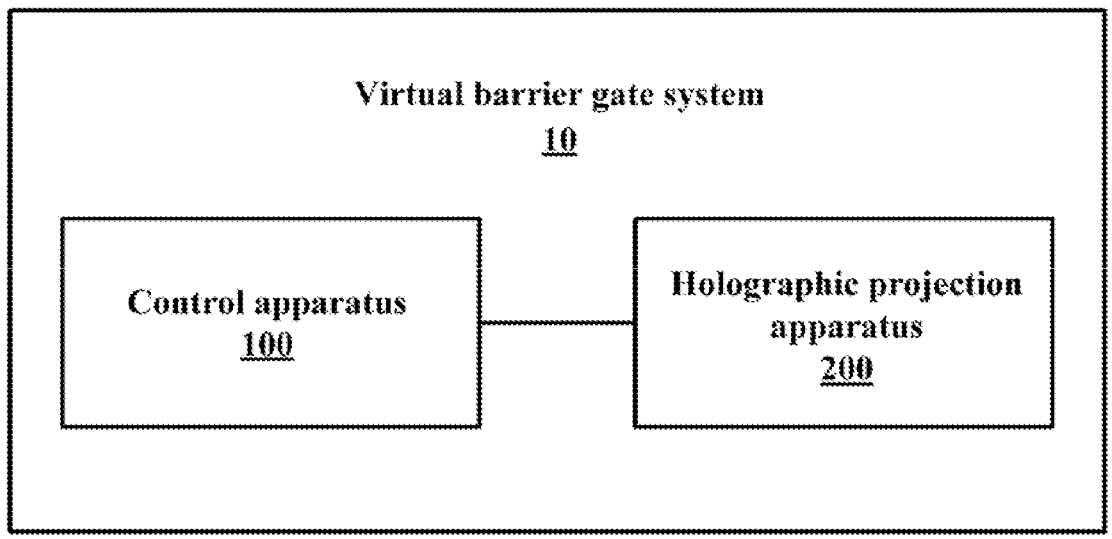
FIG. 1 shows a schematic structural diagram of a virtual barrier gate system according to an embodiment of the present invention.

Exemplary embodiments of the present disclosure will be described in more detail below with reference to the accompanying drawings. While exemplary embodiments of the present disclosure are shown in the drawings, it should be understood that the present disclosure may be embodied in various forms and should not be limited by the embodiments set forth herein. Rather, these embodiments are provided such that this disclosure will be thoroughly understood, and will fully convey the scope of the disclosure to those skilled in the art.

In order to solve or partially solve the above technical problems, an embodiment of the present invention provides a virtual barrier gate system.

FIG. 1 shows a schematic structural diagram of a virtual barrier gate system 10 according to an embodiment of the present invention. Referring to FIG. 1, the virtual barrier gate system 10 may at least include a control apparatus 100 and a holographic projection apparatus 200 connected to the control apparatus 100.

The control apparatus 100 may generate a first control signal on the basis of a starting signal and send the first control signal to the holographic projection apparatus 200. The starting signal may be input by a user, for example, input via a user interface of the control apparatus 100; or may be generated according to a preset trigger condition, for example, the starting signal may be automatically generated by the control apparatus 100 when a preset time is reached.

The holographic projection apparatus 200 projects, according to the received first control signal, a three-dimensional holographic image with a specified shape to a preset position to serve as a virtual barrier gate. The preset position can be any position where the passing in and out of a target object are required to be managed, such as a traffic light intersection, a highway toll station, a parking lot entrance or exit, a community entrance or exit, or the like. The holographic projection apparatus 200 performs three-dimensional holographic image projection using air holographic projection technology. The holographic projection technology, also known as virtual imaging technology, refers to a technology for recording and reproducing a real three-dimensional image of an object by using the principles of interference and diffraction. The air holographic projection technology is cutting-edge technology in the holographic projection technology, can be separated from the dependence of a medium, and realizes holographic three-dimensional aerial imaging, thereby realizing medium-free omnidirectional three-dimensional imaging of any object.

In the virtual barrier gate system 10 according to the embodiment of the present invention, the holographic projection apparatus 200 projects, according to the first control signal of the control apparatus 100, the three-dimensional holographic image with the specified shape to the preset position to serve as the virtual barrier gate. With regard to a virtual barrier gate obtained by using air holographic projection technology to virtualize a physical barrier gate into an air holographic projection image, the technological content is high, a mechanical fault is not likely to occur, an event where a barrier gate smashes a vehicle or hurts a pedestrian will not happen, and a special guardian is not needed, thereby improving the safety of the barrier gate and reducing labor costs.

In addition, the specified shape of the three-dimensional holographic image projected by the holographic projection apparatus 200 may be set in advance. For example, the shape of the projected three-dimensional holographic image may be set to the shape of a character, a specific mascot, a gate, or the like, such that an image of the character, the specific mascot, the gate, or the like, may be holographically projected as the virtual barrier gate. Or, the specified shape of the three-dimensional holographic image projected by the holographic projection apparatus 200 may be set to a shape similar to that of a horizontal rotation rod of a lifting rod of an existing barrier gate, such that the visual effect of the virtual barrier gate is closer to that of a currently adopted physical barrier gate. Thus, by presetting the specified shapes of the three-dimensional holographic images of the virtual barrier gates in different forms, the virtual barrier gates in various forms can be realized, such that the virtual barrier gates can be used in different application sites, and the adaptability of the virtual barrier gates is enhanced.

In one embodiment, when the holographic projection apparatus 200 performs the projection of the three-dimensional holographic image, a specific text or pattern may be added to the projected three-dimensional holographic image. The text may be, for example, an advertising slogan, a promotional phrase, a welcome phrase, or the like, and the pattern may be, for example, an advertising picture, a brand logo, or the like. Furthermore, the holographic projection apparatus 200 may switch the specific text or pattern according to a preset rule, for example, according to a preset sequence and a periodic sequence, or according to an instruction of the control apparatus 100. Thus, the virtual barrier gate system 10 according to the embodiment of the present invention can realize fast switching of propaganda materials, such as advertisements, and solve the problem that advertisements in the existing barrier gate are difficult to change.

Figure 2:
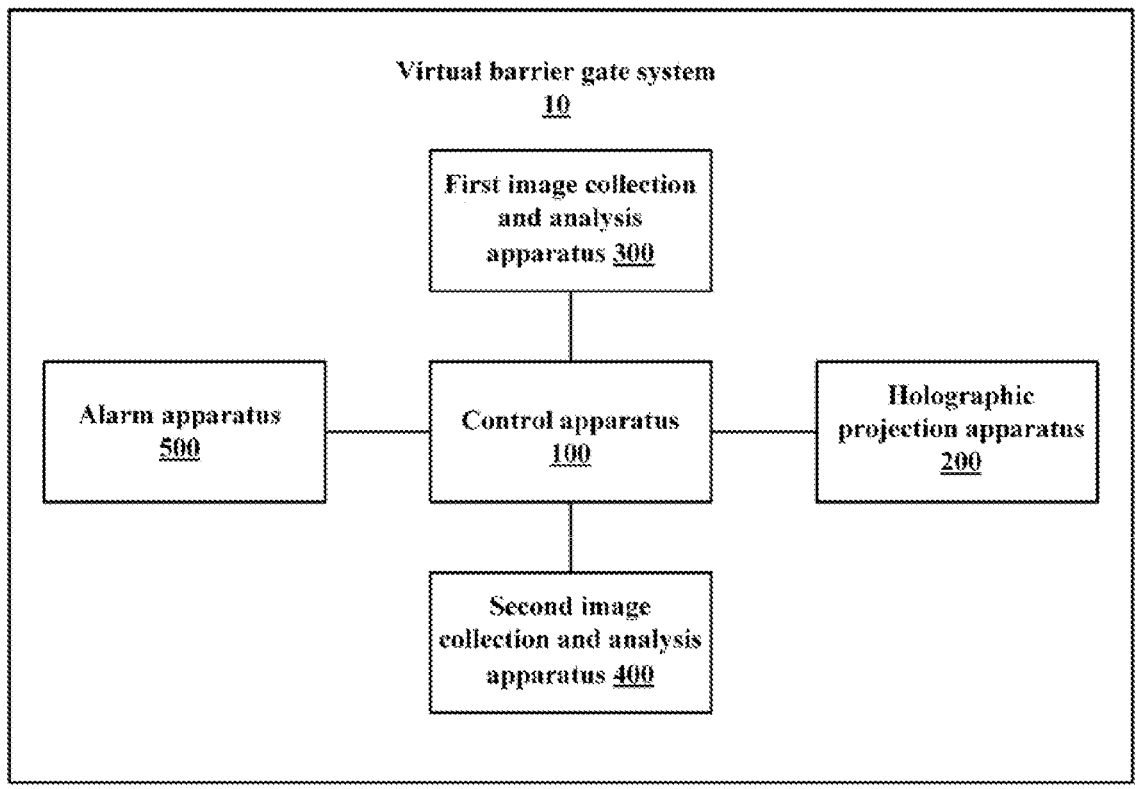
FIG. 2 shows a schematic structural diagram of a virtual barrier gate system according to another embodiment of the present invention.

In one embodiment, referring to FIG. 2, the virtual barrier gate system 10 may further include a first image collection and analysis apparatus 300. The first image collection and analysis apparatus 300 is connected to the control apparatus 100. The first image collection and analysis apparatus 300 collects image data in a first specified region before the preset position in a direction in which an object moves towards the preset position, identifies the image data to obtain an attribute of a target object in the first specified region and send the attribute of the target object to the control apparatus 100. The first specified region is a region adjacent to the preset position in which the object is located when moving towards the preset position but does not reach the preset position. The target object may be, for example, a vehicle, a pedestrian, or the like. The attribute of the target object refers to an object characteristic which can be used to distinguish between different target objects. For example, when the vehicle serves as the target object, the attribute thereof may include a license plate number, a vehicle model, a color, or the like.

In this case, the control apparatus 100 may further generate a second control signal according to the attribute of the target object and send the second control signal to the holographic projection apparatus 200. Then, the holographic projection apparatus 200 may further modify the three-dimensional holographic image projected to the preset position according to the second control signal. Specifically, the shape of the three-dimensional holographic image projected to the preset position may be modified.

For example, assuming that the three-dimensional holographic image projected to the preset position by the holographic projection apparatus 200 according to the first control signal is an image of a closed gate, when the first image collection and analysis apparatus 300 identifies the collected image data in the first specified region to obtain an attribute of a pedestrian in the first specified region (indicating that a pedestrian is about to pass through the preset position), the control apparatus 100 generates the second control signal according to the identified attribute of the pedestrian, and then, the holographic projection apparatus 200 changes the projected three-dimensional holographic image into an image of an open gate according to the second control signal. After the pedestrian passes through the preset position, the holographic projection apparatus 200 may restore the projected three-dimensional holographic image to the image of the closed gate.

For another example, assuming that the three-dimensional holographic image projected to the preset position by the holographic projection apparatus 200 according to the first control signal is an image of a horizontal rotation rod, when the first image collection and analysis apparatus 300 identifies the collected image data in the first specified region to obtain an attribute of a vehicle in the first specified region, the control apparatus 100 determines that the vehicle can pass through the preset position according to the identified attribute of the vehicle and then generates the second control signal, and then, the holographic projection apparatus 200 changes the projected three-dimensional holographic image into an image of lifting of the horizontal rotation rod according to the second control signal. After the vehicle passes through the preset position, the holographic projection apparatus 200 may restore the projected three-dimensional holographic image to the image of the horizontal rotation rod.

In the embodiment of the present invention, target-oriented barrier gate image switching is realized by the first image collection and analysis apparatus 300 identifying the attribute of the target object about to pass through the virtual barrier gate and then by the holographic projection apparatus 200 modifying the projected three-dimensional holographic image according to the second control signal generated by the control apparatus 100 based on the attribute of the target object, thereby improving the use experience of target personnel passing through the barrier gate.

Specifically, the first image collection and analysis apparatus 300 may be a first camera. The first camera may identify the collected image data by using an existing identification method to obtain the attribute of the target object, which should be known by those skilled in the art and is not repeated herein.

In one embodiment, in a case where the specific text or pattern is added to the three-dimensional holographic image projected by the holographic projection apparatus 200, the control apparatus 100 may further generate a third control signal according to the attribute of the target object and send the third control signal to the holographic projection apparatus 200. Then, the holographic projection apparatus 200 may switch the specific text or pattern in the three-dimensional holographic image according to the third control signal. In particular, in a case where the target object is a vehicle, the attribute of the target object may include a license plate number, a vehicle model, a color, or the like. It may be appreciated by those skilled in the art that different license plate numbers, vehicle models, colors, or the like, (particularly the license plate numbers) may often characterize different identities of drivers or passengers of the vehicle. Therefore, the personalized text or pattern can be presented by the way that the control apparatus 100 generates the third control signal according to the attribute of the vehicle, and then the holographic projection apparatus 200 switches the specific text or pattern in the three-dimensional holographic image according to the third control signal. In a specific implementation, the specific text or pattern may be, for example, a welcome phrase, a welcome picture, or the like, matched with the attribute of the vehicle. Correspondingly, the holographic projection apparatus 200 may display the welcome phrase or welcome picture matched with the attribute of the vehicle in the three-dimensional holographic image according to the third control signal. For example, when the identified license plate number indicates that the driver or passenger of the vehicle is a guest, the holographic projection apparatus 200 may switch the welcome phrase in the three-dimensional holographic image (i.e., the virtual barrier gate) to "welcome"; when the identified license plate number indicates that the driver or passenger of the vehicle is a high-level leader, the holographic projection apparatus 200 may switch the welcome phrase in the three-dimensional holographic image to "welcome presence and guidance"; when the identified license plate number indicates that the driver or passenger of the vehicle is an employee, the holographic projection apparatus 200 may switch the welcome phrase in the three-dimensional holographic image to "innovate, struggle, keep improving". A scenario operation for different target characters is realized with the presentation of the personalized text or pattern, and the use experience is better.

In addition, it should be noted that, in a case where the holographic projection apparatus 200 is configured to switch the specific text or pattern in the three-dimensional holographic image according to the preset rule, the holographic projection apparatus 200 may be set to switch the specific text or pattern in the three-dimensional holographic image according to the third control signal preferentially when receiving the third control signal, so as to perform personalized presentation of the text or pattern on the virtual barrier gate for the target object.

In one embodiment, with continued reference to FIG. 2, in the case where the target object is a vehicle, the virtual barrier gate system 10 may further include a second image collection and analysis apparatus 400. The second image collection and analysis apparatus 400 is connected to the control apparatus 100. The second image collection and analysis apparatus 400 collects image data in a second specified region before the preset position in a direction in which the vehicle is driven towards the preset position, processes the collected image data to obtain driving data of the vehicle in the second specified region, and sends the driving data of the vehicle to the control apparatus. The driving data here may include a driving speed, a driving lane, a driver status (for example, whether the driver wears a seat belt), or the like. Specifically, the second image collection and analysis apparatus 400 may be a second camera. The second camera may process the collected image data by using an existing processing method to obtain the driving data of the vehicle, which should be known by those skilled in the art and is not repeated herein. By arranging the second image collection and analysis apparatus, the driving state of the vehicle about to pass through the virtual barrier gate at the preset position can be monitored, so as to find a violation behavior of the vehicle in time.

In practical applications, the first specified region and the second specified region may be the same or different regions. When the first specified region and the second specified region are the same region, the same camera may be used for the first image collection and analysis apparatus 300 and the second image collection and analysis apparatus 400, so as to reduce the number of components of the system and reduce the cost. When the first specified region and the second specified region are different regions, the second specified region may be located before the first specified region in the direction in which the vehicle is driven towards the preset position, and the first image collection and analysis apparatus 300 and the second image collection and analysis apparatus 400 are implemented by two independent cameras. Since the speed of the vehicle is usually reduced to a low value when the vehicle reaches the first specified region adjacent to the position of the virtual barrier gate, and the driving data of the vehicle obtained at this point cannot reflect the real driving state of the vehicle in the driving process, by obtaining the driving data of the vehicle in the second specified region before the first specified region through collection and analysis of the second image collection and analysis apparatus 400, the driving state of the vehicle can be reflected more accurately, thereby finding the violation behavior of the vehicle more accurately.

Further, in one embodiment, with continued reference to FIG. 2, the virtual barrier gate system 10 may further include an alarm apparatus 500 connected to the control apparatus 100. In this case, the control apparatus 100, after receiving the driving data of the vehicle sent from the second image collection and analysis apparatus 400, generates an alarm signal according to the driving data of the vehicle and sends the alarm signal to the alarm apparatus 500. Specifically, the control apparatus 100 may determine whether the vehicle has a violation behavior (for example, whether the vehicle is driven too fast, whether the vehicle illegally uses a lane, or the like) according to the driving data of the vehicle, and if the violation behavior occurs, generate the alarm signal and transmit the alarm signal to the alarm apparatus 500. Then, the alarm apparatus 500 gives an alarm according to the received alarm signal. The manner of giving an alarm by the alarm apparatus 500 may include a voice alarm, an image display (e.g., a text or picture) alarm, or the like.

In some embodiments, the alarm apparatus 500 may be integrated with the holographic projection apparatus 200 (for example, an alarm function may be integrated in the holographic projection apparatus 200 to implement the alarm apparatus 500). Upon receiving the alarm signal from the control apparatus 100, the holographic projection apparatus 200 may directly add alarm information (such as text or picture information) in the projected three-dimensional holographic image to prompt the vehicle driver of the violation behavior.

Further, in one embodiment, while performing processing to obtain the driving data of the vehicle, the second image collection and analysis apparatus 400 may identify the collected image data to obtain the attribute of the vehicle in the second specified region, and transmit the obtained attribute of the vehicle to the control apparatus 100 together with the driving data of the vehicle. After receiving the attribute of the vehicle in the first specified region (which may be referred to as a first vehicle attribute) currently transmitted by the first image collection and analysis apparatus 300 and the attribute of the vehicle in the second specified region (which may be referred to as a second vehicle attribute) transmitted by the second image collection and analysis apparatus 400, the control apparatus determines whether the first vehicle attribute is consistent with the second vehicle attribute, and if yes, transmits the alarm signal generated according to the driving data of the vehicle in the second specified region to the alarm apparatus 500 integrated with the holographic projection apparatus 200, and then, the holographic projection apparatus 200 gives an alarm to the vehicle in the first specified region before the virtual barrier gate. This way is particularly suitable for the condition where the traffic flow is large and/or the first specified region is far away from the second specified region, and the pertinence and accuracy of the alarm can be ensured.

In addition, after determining that the vehicle has a violation behavior, the control apparatus 100 may upload the violation behavior of the vehicle to a vehicle management center for recording through a network connection component.

Figure 3:
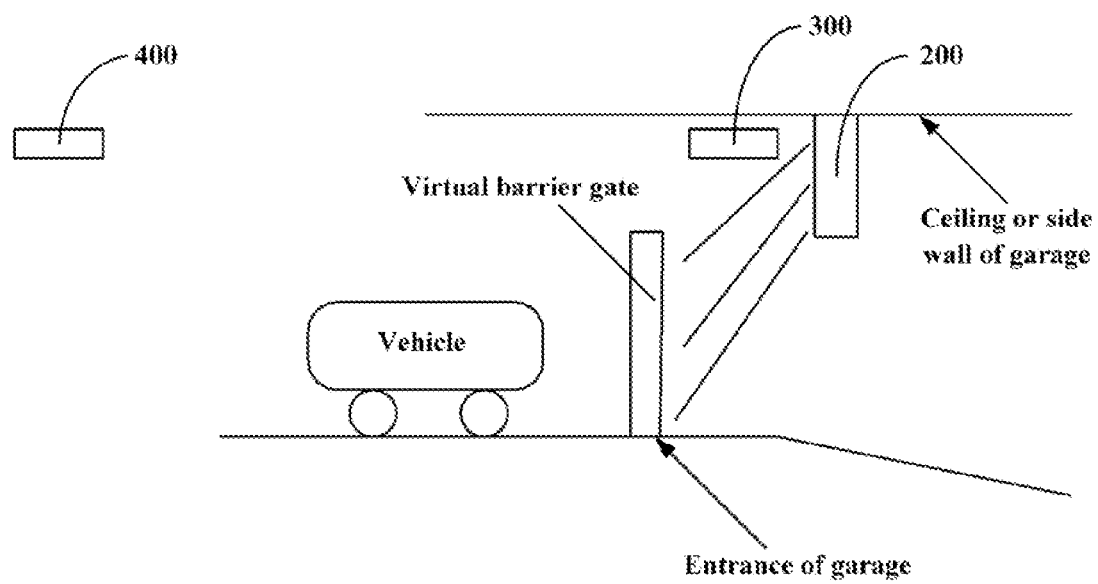
FIG. 3 shows a schematic diagram of an application scenario of a virtual barrier gate system according to an embodiment of the present invention.

In this way, the violation behavior of the vehicle can be monitored in real time and corresponding processing may be performed, thereby more effectively restraining a driving behavior of the vehicle. The virtual barrier gate system 10 according to the present invention is particularly suitable for traffic management of a garage. FIG. 3 shows a schematic diagram of an application scenario of a virtual barrier gate system 10 according to an embodiment of the present invention. As shown in FIG. 3, the virtual barrier gate system 10 is applied to a garage (for example, an underground garage). In this case, the preset position may be an entrance or an exit of the garage (specifically, an entrance of the garage in FIG. 3). The holographic projection apparatus 200 may be provided on a ceiling or a side wall at the entrance or exit of the garage, and projects a three-dimensional holographic image to the entrance or exit of the garage to form a virtual barrier gate. The holographic projection apparatus 200 may be positioned directly opposite to or near the entrance or exit of the garage. A first camera 300 may be positioned adjacent to the holographic projection apparatus 200, and is configured to collect image data of the vehicle in front of the virtual barrier gate, and identify the attribute of the vehicle. A second camera 400 is positioned relatively further from the entrance or exit of the garage compared to the first camera 300, and is configured to collect image data of the vehicle traveling towards the virtual barrier gate, and process the image data to obtain driving data of the vehicle. It should be noted that the control apparatus 100 is not shown in FIG. 3, and in practical applications, the control apparatus 100 may be positioned in a central control room of the garage or any other suitable location as long as connection communication with the holographic projection apparatus 200, the first camera 300 and the second camera 400 can be ensured. The present embodiment not only realizes virtualization of a physical barrier gate, overcomes the problems that the existing physical barrier gate is prone to have a mechanical fault, is prone to smash a vehicle or hurt a pedestrian and needs a special guardian, but also realizes target-oriented flexible and rapid image switching, and meanwhile can effectively monitor the driving behavior of the vehicle.

Based on the same technical concept, an embodiment of the present invention further provides a virtual barrier gate control method.

Figure 4:
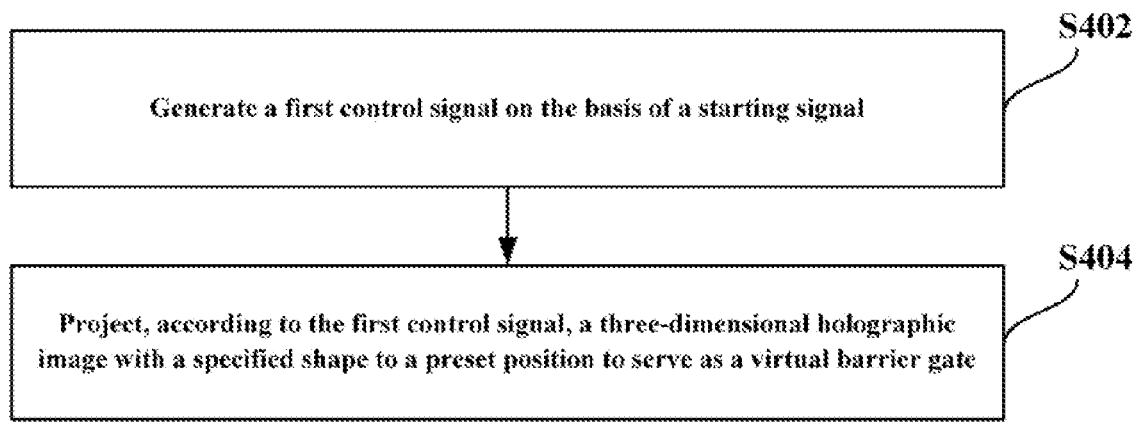
FIG. 4 shows a schematic flow diagram of a virtual barrier gate control method according to an embodiment of the present invention.

FIG. 4 shows a schematic flow diagram of a virtual barrier gate control method according to an embodiment of the present invention. Referring to FIG. 4, the method may at least include the following steps S402 to S404.

Step S402: generating a first control signal on the basis of a starting signal.

The starting signal may be input by a user, or may be generated according to a preset trigger condition, for example, the starting signal is automatically generated when a preset time is reached.

Step S404: projecting, according to the first control signal, a three-dimensional holographic image with a specified shape to a preset position to serve as a virtual barrier gate.

In this step, three-dimensional holographic image projection is performed using air holographic projection technology. The air holographic projection technology can be separated from the dependence of a medium, and realizes holographic three-dimensional aerial imaging, thereby realizing medium-free omni-directional three-dimensional imaging of any object. The preset position can be any position where the passing in and out of a target object are required to be managed, such as a traffic light intersection, a highway toll station, a parking lot entrance or exit, a community entrance or exit, or the like.

In the virtual barrier gate control method according to the embodiment of the present invention, with regard to a virtual barrier gate obtained by using air holographic projection technology to virtualize a physical barrier gate into an air holographic projection image, the technological content is high, a mechanical fault is not likely to occur, an event where a barrier gate smashes a vehicle or hurts a pedestrian will not happen, and a special guardian is not needed, thereby improving the safety of the barrier gate and reducing labor costs.

In addition, the specified shape of the projected three-dimensional holographic image may be set in advance. For example, the shape of the projected three-dimensional holographic image may be set to a shape of a character, a specific mascot or a gate, and even a shape similar to that of a horizontal rotation rod of a lifting rod of an existing barrier gate, or the like. By presetting the specified shapes of the three-dimensional holographic images of the virtual barrier gates in different forms, the virtual barrier gates in various forms can be realized, such that the virtual barrier gates can be used in different application sites, and the adaptability of the virtual barrier gates is enhanced.

In one embodiment, a specific text or pattern may be contained in the projected three-dimensional holographic image. The text may be, for example, an advertising slogan, a promotional phrase, a welcome phrase, or the like, and the pattern may be, for example, an advertising picture, a brand logo, or the like. In this case, during the projection and display of the three-dimensional holographic image, the virtual barrier gate control method according to the present invention may further include: switching the specific text or pattern in the three-dimensional holographic image according to a preset rule. For example, switching is performed according to a preset sequence and a periodic sequence, or according to a corresponding control instruction. Thus, the embodiment of the present invention can realize fast switching of propaganda materials, such as advertisements, and solve the problem that advertisements in the existing barrier gate are difficult to change.

Figure 5:
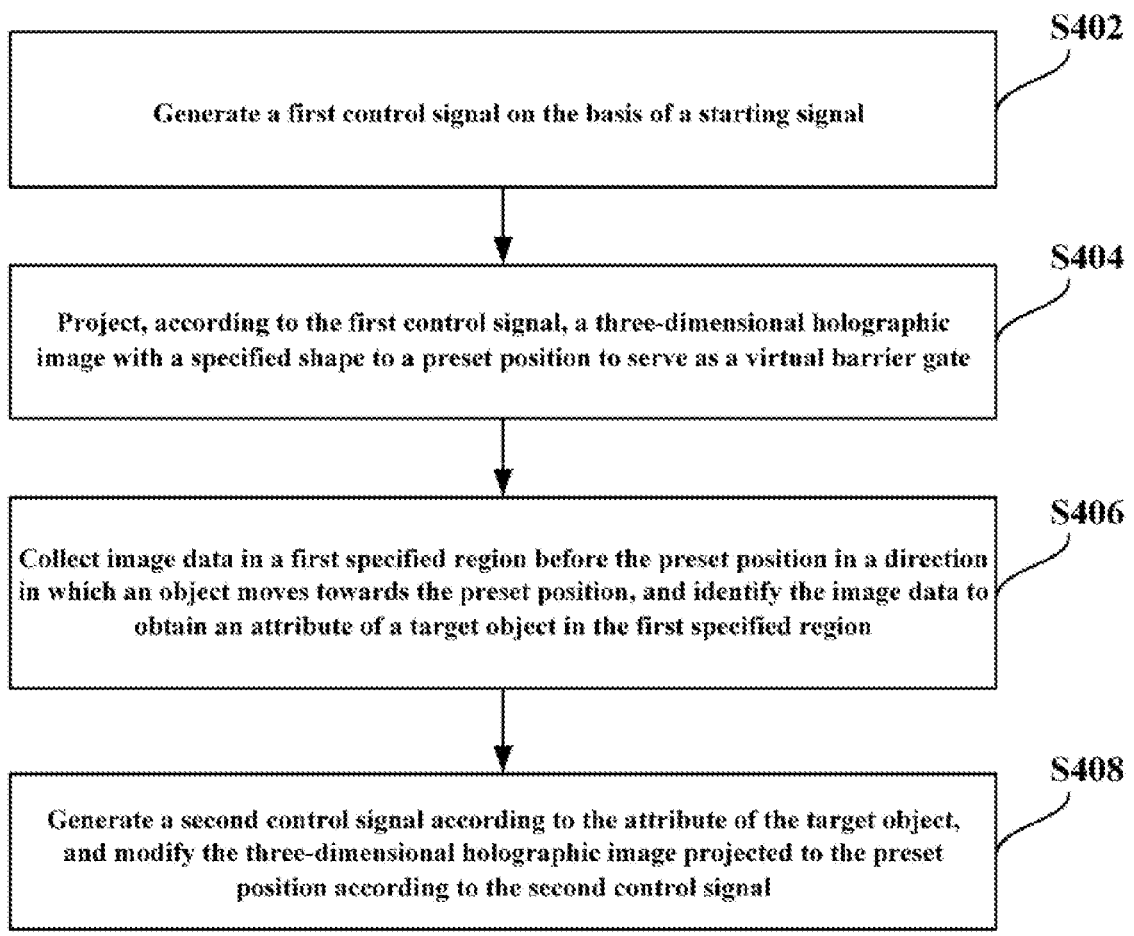
FIG. 5 shows a schematic flow diagram of a virtual barrier gate control method according to another embodiment of the present invention.

In one embodiment, referring to FIG. 5, the virtual barrier gate control method according to the present invention may further include:

step S406: collecting image data in a first specified region before the preset position in a direction in which an object moves towards the preset position, and identifying the image data to obtain an attribute of a target object in the first specified region.

The first specified region is a region adjacent to the preset position in which the object is located when moving towards the preset position but does not reach the preset position. The target object may be, for example, a vehicle, a pedestrian, or the like. The attribute of the target object refer to an object characteristic which can be used to distinguish between different target objects. For example, when the vehicle serves as the target object, the attribute thereof may include a license plate number, a vehicle model, a color, or the like.

Step S408: generating a second control signal according to the attribute of the target object, and modifying the three-dimensional holographic image projected to the preset position according to the second control signal.

In this step, specifically, the shape of the three-dimensional holographic image projected to the preset position may be modified according to the second control signal.

For example, assuming that the three-dimensional holographic image projected to the preset position in step S404 according to the first control signal is an image of a horizontal rotation rod, when the collected image data in the first specified region is identified to obtain an attribute of a vehicle in the first specified region, the second control signal is generated according to the identified attribute of the vehicle, and then, the projected three-dimensional holographic image is changed into an image of lifting of the horizontal rotation rod according to the second control signal. After the vehicle passes through the preset position, the projected three-dimensional holographic image may be restored to the image of the horizontal rotation rod.

In the embodiment of the present invention, target-oriented barrier gate image switching may be realized by identifying the attribute of the target object about to pass through the virtual barrier gate and then modifying the projected three-dimensional holographic image according to the second control signal generated based on the attribute of the target object, thereby improving the use experience of target personnel passing through the barrier gate.

In one embodiment, in a case where the specific text or pattern is contained in the projected three-dimensional holographic image, a third control signal may be generated according to the attribute of the target object, and the specific text or pattern in the three-dimensional holographic image may be switched according to the third control signal.

In particular, in a case where the target object is a vehicle, the attribute of the target object may include a license plate number, a vehicle model, a color, or the like. Since the attribute of the vehicle may often characterize different identities of drivers or passengers of the vehicle, the personalized text or pattern can be presented by generating the third control signal according to the attribute of the vehicle, and then by switching the specific text or pattern in the three-dimensional holographic image according to the third control signal.

Further, the specific text or pattern in the three-dimensional holographic image may be a welcome phrase, a welcome picture, or the like, matched with the attribute of the vehicle. Correspondingly, the welcome phrase or welcome picture matched with the attribute of the vehicle may be displayed in the three-dimensional holographic image according to the third control signal. Specifically, the third control signal may carry the attribute of the vehicle, and the welcome phrase or welcome picture matched with the attribute of the vehicle may be found out according to the attribute of the vehicle for display. For example, assuming that the attribute of the target object is the license plate number of the vehicle, when the identified license plate number indicates that the driver or passenger of the vehicle is a guest, the welcome phrase in the three-dimensional holographic image (i.e., the virtual barrier gate) may be switched to "welcome"; when the identified license plate number indicates that the driver or passenger of the vehicle is a high-level leader, the welcome phrase in the three-dimensional holographic image may be switched to "welcome presence and guidance"; when the identified license plate number indicates that the driver or passenger of the vehicle is an employee, the welcome phrase in the three-dimensional holographic image may be switched to "innovate, struggle, keep improving". A scenario operation for different target characters is realized with the presentation of the personalized text or pattern, and the use experience is better.

In addition, it should be noted that, in a case where the specific text or pattern in the three-dimensional holographic image is switched according to the preset rule during the projection and display of the three-dimensional holographic image, the specific text or pattern in the three-dimensional holographic image is switched according to the third control signal preferentially, so as to perform personalized presentation of the text or pattern on the virtual barrier gate for the target object.

In one embodiment, before the step S406 of collecting image data in the first specified region before the preset position in the direction in which an object moves towards the preset position, the method may further include: collecting image data in a second specified region before the preset position in a direction in which the vehicle is driven towards the preset position, and processing the image data to obtain driving data of the vehicle in the second specified region. The driving data may include a driving speed, a driving lane, a driver status (for example, whether the driver wears a seat belt), or the like.

Further, an alarm signal may be generated according to the driving data of the vehicle, and an alarm may be given according to the alarm signal. Specifically, whether the vehicle has a violation behavior (for example, whether the vehicle is driven too fast, whether the vehicle illegally uses a lane, or the like) may be determined according to the driving data of the vehicle, and if the violation behavior occurs, the alarm signal is generated, and the alarm is given according to the alarm signal. The manner of giving an alarm may include a voice alarm, an image display (e.g., a text or picture) alarm, or the like. The alarm can be given when the violation behavior of the vehicle is found, or given when the vehicle enters the first specified region before the virtual barrier gate. If the alarm is given when the vehicle enters the first specified region before the virtual barrier gate, alarm information (such as text or picture information) may be directly added in the projected three-dimensional holographic image to prompt the vehicle driver of the violation behavior.

In practical applications, the first specified region and the second specified region may be the same or different regions. When the first specified region and the second specified region are different regions, the second specified region may be located before the first specified region in the direction in which the vehicle is driven towards the preset position. Since the speed of the vehicle is usually reduced to a low value when the vehicle reaches the first specified region adjacent to the position of the virtual barrier gate, and the driving data of the vehicle obtained at this point cannot reflect the real driving state of the vehicle in the driving process, by obtaining the driving data of the vehicle in the second specified region before the first specified region through collection and analysis, the driving state of the vehicle can be reflected more accurately, thereby finding the violation behavior of the vehicle more accurately.

Further, in one embodiment, while the collected image data in the second specified region is processed to obtain the driving data of the vehicle, the collected image data may be identified to obtain the attribute of the vehicle in the second specified region (which may be referred to as a second vehicle attribute). Thus, after the collected image data in the first specified region is identified to obtain the attribute of the vehicle (which may be referred to as a first vehicle attribute), whether the first vehicle attribute is consistent with the second vehicle attribute is determined, and if yes, the alarm signal is generated according to the driving data of the vehicle in the second specified region, and an alarm is given to the vehicle in the first specified region before the virtual barrier gate. This way is particularly suitable for the condition where the traffic flow is large and/or the first specified region is far away from the second specified region, and the pertinence and accuracy of the alarm can be ensured.

In addition, after the vehicle is determined to have a violation behavior, the violation behavior of the vehicle may be uploaded to a vehicle management center for recording.

In this way, the violation behavior of the vehicle can be monitored in real time and corresponding processing may be performed, thereby more effectively restraining a driving behavior of the vehicle.

According to any one or a combination of plural optional embodiments, the embodiments of the present invention can achieve the following beneficial effects.

In the virtual barrier gate system and the virtual barrier gate control method according to the embodiments of the present invention, the three-dimensional holographic image with the specified shape is projected to the preset position according to the first control signal generated based on the starting signal to serve as the virtual barrier gate. With regard to a virtual barrier gate obtained by using air holographic projection technology to virtualize a physical barrier gate into an air holographic projection image, the technological content is high, a mechanical fault is not likely to occur, an event where a barrier gate smashes a vehicle or hurts a pedestrian will not happen, and a special guardian is not needed, thereby improving the safety of the barrier gate and reducing labor costs. Moreover, the specified shape of the three-dimensional holographic image of the virtual barrier gate can be preset and has various forms, such that the virtual barrier gate can be used at different application sites, and the adaptability of the virtual barrier gate is enhanced.

Further, in the solution of the embodiment of the present invention, targeted barrier gate image switching may be realized by identifying the attribute of the target object about to pass through the virtual barrier gate and then modifying the projected three-dimensional holographic image according to the second control signal generated based on the attribute of the target object, thereby improving the use experience of target personnel passing through the barrier gate.

In the description provided herein, numerous specific details are set forth. However, it can be understood that the embodiments of the present invention may be practiced without these specific details. In some instances, well-known methods, structures and technology are not shown in detail, in order not to obscure an understanding of this description.

Finally, it should be noted that the above embodiments are only used to illustrate the technical solutions of the present invention, not to limit the present invention; although the present invention is described in detail with reference to the above embodiments, those having ordinary skill in the art should understand that, within the spirit and principle of the present invention, they still can modify technical solutions recited in the aforesaid embodiments or equivalently replace partial or all technical features therein; these modifications or substitutions do not make corresponding technical solutions depart from the protection scope of the present invention.

What is claimed is:

1. A virtual barrier gate control method, comprising:
generating a first control signal on the basis of a starting signal; and
projecting, according to the first control signal, a three-dimensional holographic image with a specified shape to a preset position to serve as a virtual barrier gate;
wherein a specific text or pattern is contained in the three-dimensional holographic image;
the method further comprises:
switching the specific text or pattern according to a preset rule;
collecting image data in a first specified region before the preset position in a direction in which an object moves towards the preset position, and identifying the image data to obtain an attribute of a target object in the first specified region; and
generating a second control signal according to the attribute of the target object, and modifying the three-dimensional holographic image projected to the preset position according to the second control signal;
wherein the target object is a vehicle;
the attribute comprises at least one of: a license plate number, a vehicle model and a color; and
the before collecting image data in the first specified region before the preset position in the direction in which an object moves towards the preset position, the method further comprises:
collecting image data in a second specified region before the preset position in a direction in which the vehicle is driven towards the preset position, and processing the image data to obtain driving data of the vehicle in the second specified region; and generating an alarm signal according to the driving data of the vehicle, and giving an alarm according to the alarm signal.

2. The control method according to claim 1, wherein the specific text contains a welcome phrase matched with the attribute of the vehicle;

the method further comprises:

generating a third control signal according to the attribute of the vehicle, and displaying the welcome phrase matched with the attribute of the vehicle in the three-dimensional holographic image according to the third control signal.

3. A virtual barrier gate system, comprising a control apparatus and a holographic projection apparatus connected to the control apparatus;

wherein the control apparatus is configured to generate a first control signal on the basis of a starting signal and send the first control signal to the holographic projection apparatus;

the holographic projection apparatus is configured to project, according to the first control signal, a three-dimensional holographic image with a specified shape to a preset position to serve as a virtual barrier gate;

a specific text or pattern is contained in the three-dimensional holographic image;

the holographic projection apparatus is further configured to switch the specific text or pattern according to a preset rule; and the system further comprises:

a first camera connected with the control apparatus and configured to collect image data in a first specified region before the preset position in a direction in which an object moves towards the preset position, identify the image data to obtain an attribute of a target object in the first specified region and send the attribute of the target object to the control apparatus;

wherein the control apparatus is further configured to generate a second control signal according to the attribute of the target object and send the second control signal to the holographic projection apparatus;

the holographic projection apparatus is further configured to modify the three-dimensional holographic image projected to the preset position according to the second control signal;

the target object is a vehicle;

the attribute comprises at least one of: a license plate number, a vehicle model and a color; and the system further comprises:

a second camera and an alarm apparatus which are connected to the control apparatus;

wherein the second camera is configured to collect image data in a second specified region before the preset position in a direction in which the vehicle is driven towards the preset position, process the image data to obtain driving data of the vehicle in the second specified region, and send the driving data of the vehicle to the control apparatus;

the control apparatus is further configured to generate an alarm signal according to the driving data of the vehicle and send the alarm signal to the alarm apparatus; and the alarm apparatus is configured to give an alarm according to the alarm signal.

4. The virtual barrier gate system according to claim 3, wherein the specific text contains a welcome phrase matched with the attribute of the vehicle;

the control apparatus is further configured to generate a third control signal according to the attribute of the vehicle and send the third control signal to the holographic projection apparatus; and the holographic projection apparatus is further configured to display the welcome phrase matched with the attribute of the vehicle in the three-dimensional holographic image according to the third control signal.

5. The virtual barrier gate system according to claim 3, wherein the preset position is an entrance or an exit of a garage, and the holographic projection apparatus is provided on a ceiling or a side wall at the entrance or the exit of the garage.

* * * * *